(12) United States Patent  (10) Patent No.: US 8,654,236 B2
Shiozaki                   (45) Date of Patent:     Feb. 18, 2014

(54) IMAGING APPARATUS INCLUDING A CONTROL UNIT CONFIGURED TO CHANGE A CORRECTION VALUE FOR CORRECTING AN OUTPUT OF AN ORIENTATION DETECTION UNIT

(75) Inventor: Tomoyuki Shiozaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 13/150,954

(22) Filed: Jun. 1, 2011

(65) Prior Publication Data

US 2011/0310283 A1    Dec. 22, 2011

(30) Foreign Application Priority Data

Jun. 17, 2010  (JP) ................................ 2010-138540

(51) Int. Cl.
*H04N 5/222* (2006.01)
*H04N 5/228* (2006.01)

(52) U.S. Cl.
USPC .................................. 348/333.02; 348/208.2

(58) Field of Classification Search
USPC ........ 348/208.99, 208.1, 208.2, 208.3, 208.4, 348/208.5, 208.6, 208.7, 231.99, 231.3, 348/231.6, 333.01, 333.02, 333.12; 702/151, 152, 153
See application file for complete search history.

(56) References Cited

U.S. PATENT DOCUMENTS

| | | | | |
|---|---|---|---|---|
| 6,993,450 | B2 * | 1/2006 | Takemoto et al. | 702/153 |
| 7,037,258 | B2 * | 5/2006 | Chatenever et al. | 600/109 |
| 7,079,707 | B2 * | 7/2006 | Baron | 382/289 |
| 7,211,042 | B2 * | 5/2007 | Chatenever et al. | 600/117 |
| 7,467,061 | B2 * | 12/2008 | Satoh et al. | 702/150 |
| 7,720,376 | B2 * | 5/2010 | Weinberg et al. | 396/301 |
| 7,833,152 | B2 * | 11/2010 | Chatenever et al. | 600/117 |
| 8,259,174 | B2 * | 9/2012 | Zhang et al. | 348/148 |
| 8,259,208 | B2 * | 9/2012 | Ciurea et al. | 348/333.02 |
| 8,427,536 | B2 * | 4/2013 | Jiang et al. | 348/135 |
| 2003/0016883 | A1 * | 1/2003 | Baron | 382/289 |
| 2003/0144813 | A1 * | 7/2003 | Takemoto et al. | 702/153 |
| 2004/0176925 | A1 * | 9/2004 | Satoh et al. | 702/150 |
| 2005/0256391 | A1 * | 11/2005 | Satoh et al. | 600/407 |
| 2008/0174516 | A1 * | 7/2008 | Xiao et al. | 345/1.3 |
| 2008/0174704 | A1 * | 7/2008 | Tan et al. | 348/745 |
| 2008/0204566 | A1 * | 8/2008 | Yamazaki et al. | 348/208.99 |
| 2009/0073324 | A1 * | 3/2009 | Tan et al. | 348/745 |
| 2009/0091615 | A1 * | 4/2009 | Tan et al. | 348/125 |
| 2009/0154910 | A1 * | 6/2009 | Weinberg et al. | 396/50 |

(Continued)

FOREIGN PATENT DOCUMENTS

JP         2009-33500 A      2/2009

*Primary Examiner* — Nicholas Giles
(74) *Attorney, Agent, or Firm* — Canon USA Inc. IP Division

(57) ABSTRACT

An imaging apparatus selects and extracts a longest straight line from a captured image, and superimposes the straight line on the captured image to display it by a display device. An orientation detection unit including an acceleration sensor detects a roll angle. An X axis indicating a roll angle 0° and a Y axis indicating a roll angle 90° of the acceleration sensor are superimposed on the captured image, and an original point of the X and Y axes is matched with a center value of the extracted straight line to be displayed by the display device. A user rotates, by a predetermined operation, the image until the X and Y axes match the gradient of the extracted straight line. Thus, a system control unit corrects a roll angle output value of the orientation detection unit by an amount equal to a corrected rotational angle.

9 Claims, 4 Drawing Sheets

(56) References Cited

U.S. PATENT DOCUMENTS

| | | |
|---|---|---|
| 2009/0256947 A1* | 10/2009 | Ciurea et al. ............ 348/333.12 |
| 2010/0085425 A1* | 4/2010 | Tan ................................ 348/54 |
| 2010/0141780 A1* | 6/2010 | Tan et al. .................. 348/222.1 |
| 2010/0201814 A1* | 8/2010 | Zhang et al. .................. 348/148 |
| 2010/0208080 A1* | 8/2010 | Matsutani .................... 348/188 |
| 2010/0245591 A1* | 9/2010 | Tan et al. ...................... 348/184 |
| 2010/0245684 A1* | 9/2010 | Xiao et al. ..................... 348/745 |
| 2011/0115902 A1* | 5/2011 | Jiang et al. ................... 348/135 |

* cited by examiner

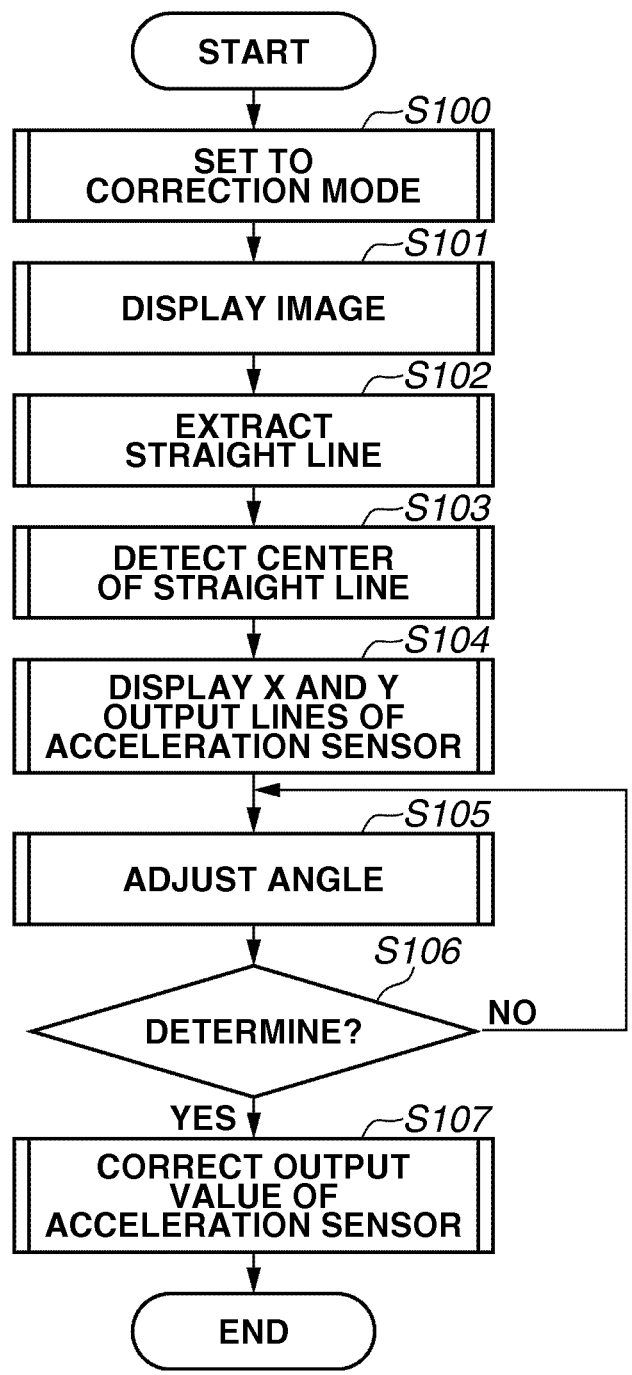

IMAGING APPARATUS INCLUDING A CONTROL UNIT CONFIGURED TO CHANGE A CORRECTION VALUE FOR CORRECTING AN OUTPUT OF AN ORIENTATION DETECTION UNIT

BACKGROUND OF THE INVENTION

1. Field of the Invention

The present invention relates to an imaging apparatus that includes an orientation detection unit for detecting an orientation and a display unit for displaying a captured image, a control method thereof, and a program.

2. Description of the Related Art

With a progress in its miniaturization and weight-reduction, a digital camera has rapidly come into widespread use. The digital camera miniaturized and reduced in weight is frequently held by a user without being fixed to a tripod to perform photographing. This creates a possibility that an orientation may not be stable during the photographing, causing a tilt unintended by a photographer in a captured image. Recently, therefore, in order to maintain the captured image in a horizontal state or in an intended tilt state, a digital camera that utilizes a sensor for detecting an orientation of an imaging apparatus has become widely used.

However, in the camera of such a configuration, due to a mounting error during assembling at a factory, a relative tilt angle is generated between an image sensor and the orientation detection sensor, and the horizontal cannot be accurately detected.

In order to solve the issue, for example, Japanese Patent Application Laid-Open No. 2009-33500 (corresponding United States Patent Publication Application No. 2010/0208080) discusses an imaging apparatus that detects an angle of an image sensor from a captured image and corrects an angle relative to an angle detected by an orientation detection sensor of the imaging apparatus, and a control method thereof.

SUMMARY OF THE INVENTION

According to an aspect of the present invention, an imaging apparatus includes an imaging unit, an orientation detection unit configured to detect an orientation of the imaging apparatus, a display unit configured to display an image captured by the imaging unit, a straight line extraction unit configured to extract a straight line from the image captured by the imaging unit, and a control unit configured to change a correction value for correcting an output of the orientation detection unit based on the straight line extracted by the straight line extraction unit.

According to the present invention, a user himself/herself can easily correct a relative angle between the imaging unit and the orientation detection unit of the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating operations of the imaging apparatus according to the first exemplary embodiment.

DESCRIPTION OF THE EMBODIMENTS

Various exemplary embodiments, features, and aspects of the invention will be described in detail below with reference to the drawings.

Figure 1:
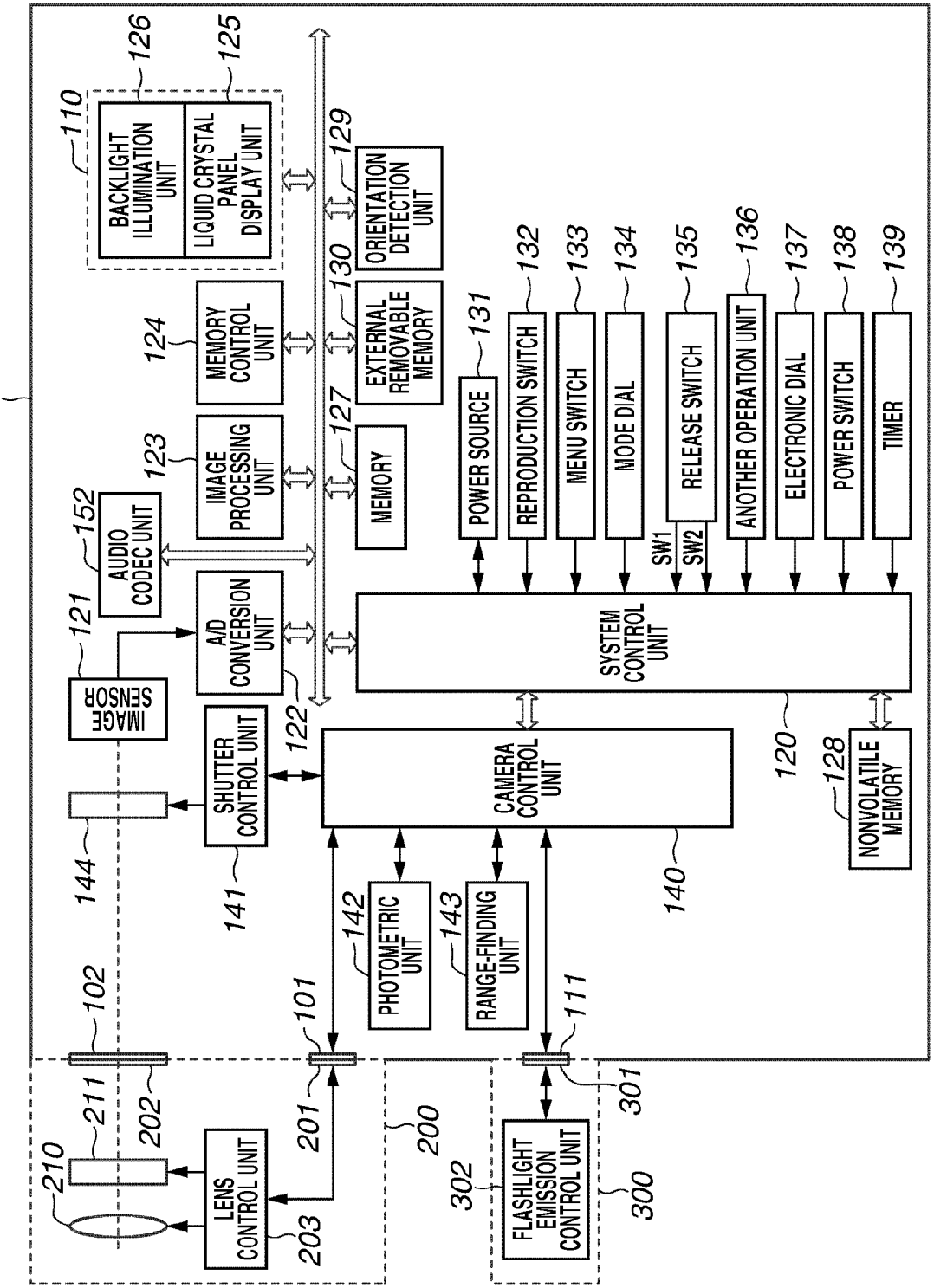
FIG. 1 is a block diagram illustrating a configuration of an imaging apparatus according to a first exemplary embodiment.

FIG. 1 is a block diagram illustrating a configuration of an imaging apparatus 100 according to a first exemplary embodiment of the present invention. An image sensor 121 forms an optical image of an object (not illustrated) via a lens 210, a diaphragm 211, lens mounts 102 and 202, and a shutter 144, and converts the optical image into an electric signal. An analog/digital (A/D) conversion unit 122 converts an analog signal output from the image sensor 121 into a digital signal. The digital signal A/D converted at the A/D conversion unit 122 is stored in a memory 127 under control of a memory control unit 124 and a system control unit 120.

An image processing unit 123 performs predetermined pixel interpolation processing or color conversion processing for data of the digital signal A/D converted at the A/D conversion unit 122 or data from the memory control unit 124. The image processing unit 123 further includes a compression/decompression circuit for compressing and decompressing image data by adaptive discrete cosine transform (ADCT). The image processing unit 123 can also read an image stored in the memory 127 to compress or decompress the image, and write processed data in the memory 127.

In the present exemplary embodiment, the image processing unit 123 has a straight line extraction function of extracting a straight line (linear image) from a captured image. As a straight line extraction method, an arbitrary algorithm such as Hough transform can be used. This conversion method enables straight line determination (straight line extraction), coordinate value extraction of both ends of the straight line on an image, and calculation of a tilt angle of the straight line on the image coordinates. A criterion for a straight line or not is set so that lines different in type or thickness, and a line including an unclear part can be extracted.

The memory control unit 124 controls transmission and reception of data between the A/D conversion unit 122, the image processing unit 123, a display device 110, and an external removable memory unit 130 and the memory 127. The data of the A/D conversion unit 122 is written in the memory 127 via the image processing unit 123 and the memory control unit 124, or directly written in the memory 127 via the memory control unit 124.

Figure 2A:
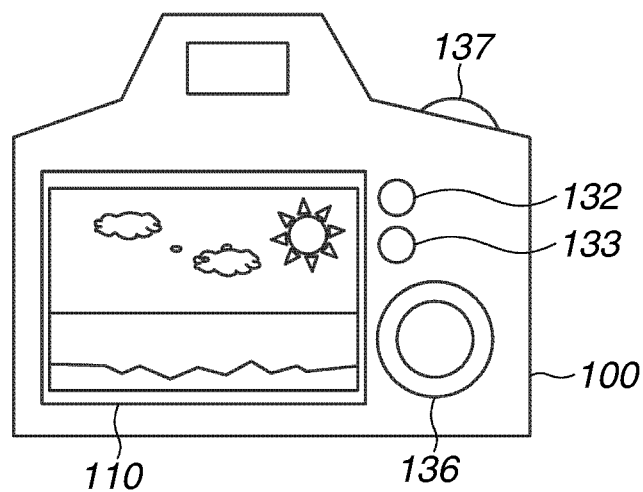
FIGS. 2A to 2C illustrate display examples on a display device.
Figure 2B:
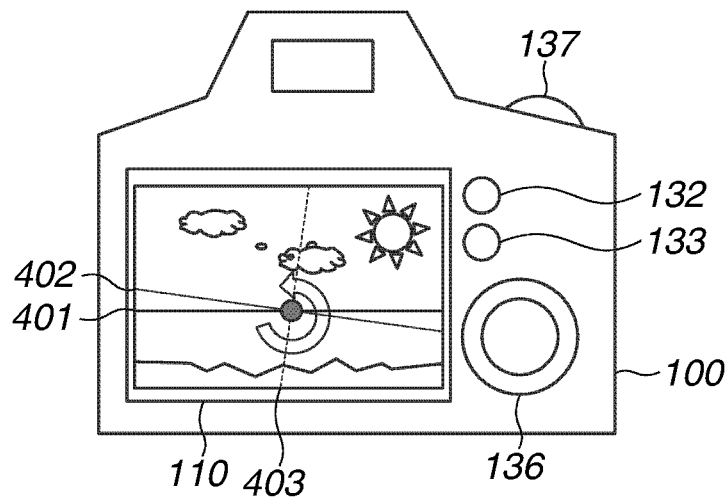
Figure 2C:
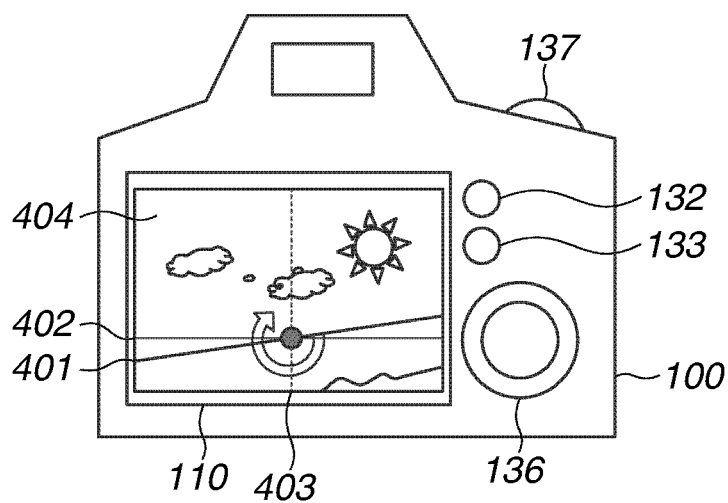

The display device 110 of a liquid crystal display type includes a liquid crystal panel display unit 125 and a backlight illumination unit 126. For example, as illustrated in FIGS. 2A to 2C, the display device 110 is arranged on a back face of the imaging apparatus 100. The liquid crystal panel display unit 125 can display, according to an instruction from the system control unit 120, a menu screen stored in an image display data area of the memory 127 or an image file stored in the external removable memory unit 130. By sequentially displaying imaging data acquired from the image sensor 121 through in real time, "live view" photographing can be performed.

The backlight illumination unit 126 illuminates the back face with respect to the liquid crystal panel display unit 125. As a light source element of the backlight illumination unit 126, a light emitting diode (LED), an organic electroluminescence (EL), or a fluorescent tube can be used. Illumination can be arbitrarily turned on or off according to the instruction from the system control unit 120.

The system control unit 120 controls the entire imaging apparatus 100. The memory 127 stores a still image, a moving image, and data of an image for reproduction display, which has been captured. The memory 127 has a storage capacity enough to store a predetermined number of still images or moving images. In the memory 127, there are secured a program stack area, a status storage area, a calculation area, a work area, an image display data area for the system control unit 120. The system control unit 120 performs various calculations using the calculation area of the memory 127.

A nonvolatile memory 128 is an electrically erasable and recordable memory. For example, a flash memory or an electrically erasable programmable read-only memory (EEPROM) can be used. The nonvolatile memory 128 stores a photographing state or a program for controlling the imaging apparatus 100.

An orientation detection unit 129 detects an orientation of the imaging apparatus 100. The orientation detection unit 129 includes, for example, an acceleration sensor and a detection circuit. A straight line (straight line indicating a detection angle of the orientation detection unit 129) indicating a detected roll angle of the acceleration sensor is superimposed on a captured image stored in the memory 127 at an arbitrary position, and displayed as a through image on the display device 110. A user can accordingly be notified of levelness of the imaging apparatus. Use of a notification unit of an LED or a warning sound enables notification of levelness to the user, for example, when the detected roll angle is −0.3<θ<0.3. Storing the captured image associated with the detected roll angle during photographing in the external removable memory unit 130 enables correction of a tilt of an image during reproduction to an angle where a roll angle of the acceleration sensor is 0°.

The external removable memory unit 130 records or reads an image file in or from a recording medium such as Compact Flash (registered trademark) or a Secure Digital (SD) card. A power source 131 includes a battery, a battery detection circuit, a direct current (DC)-DC converter, and a switch circuit for switching a block to be electrified, and detects presence or absence of a battery, a type of the battery, or a remaining capacity of the battery. The power source 131 further controls the DC-DC converter based on the detection result and an instruction from the system control unit 120 to supply a necessary voltage to each block for a necessary period.

A shutter control unit 141 controls the shutter 144 in association with a lens control unit 203 for controlling the diaphragm 211 based on photometric information from a photometric unit 142. The photometric unit 142 performs automatic exposure (AE). By entering a ray incident on the lens 210 to the photometric unit 142 via the diaphragm 211, the lens mounts 202 and 102, and a photometric lens (not illustrated), an exposure state of an image formed as an optical image can be measured.

The photometric unit 142 has an exposure factor (EF) (flash control) processing function by association with a flash unit 300. The flash unit 300 also has a light projection function of autofocus (AF) auxiliary light and a flash control function. A range-finding unit 143 performs autofocus (AF) processing. By entering the ray incident on the lens 210 to the range-finding unit 143 via the diaphragm 211, the lens mounts 202 and 102, and a range-finding mirror (not illustrated), an in-focus state of the image formed as the optical image can be measured.

A camera control unit 140 controls a series of operations of a camera by transmission and reception communication with the shutter control unit 141, the photometric unit 142, and the range-finding unit 143. The lens control unit 140 can control a lens unit 200 and the flash unit 300.

Operation units 132, 133, 134, 135, 136, 137, and 138 input various operation instructions of the system control unit 120. Each operation unit includes a combination of signal or a plurality of devices, such as a switch or a dial, a touch panel, a pointing device based on line-of-sight detection, and a voice recognition device.

The operation units are specifically described. The reproduction display switch 132 can perform a reproduction display mode operation for displaying predetermined image data on the display device 110. When the image file stored in the external removable memory unit 130 is reproduced and displayed, an operation must first be performed by the reproduction switch 132. When the reproduction switch 132 is operated in the reproduction display mode, the reproduction display mode can be switched to a photographing mode.

The menu switch 133 is used to display a list of various items on the display device 110. Contents in the list to be displayed include state setting regarding photographing, a format of a recording medium, setting of a clock, setting of development parameters, and setting of user functions (setting of custom functions).

The mode dial 134 can switch and set function photographing modes, such as an automatic photographing mode, a program photographing mode, a shutter speed priority photographing mode, a diaphragm priority photographing mode, a manual photographing mode, a portrait photographing mode, a landscape photographing mode, a sports photographing mode, a night scene photographing mode, and a moving image mode.

The release switch 135 is turned on by half-pressing (SW1) and full-pressing (SW2) of a release button. In the half-pressed state, the release switch 135 instructs a start of an operation such as AF processing, AE processing, auto white balance (AWB) processing, or EF (flash control) processing. In the fully pressed state, imaging processing is performed to write a signal read from the image sensor 121 as image data in the memory 127 via the A/D conversion unit 122 or the memory control unit 124, or development processing is performed using calculation at the image processing unit 123 or the memory control unit 124. The release switch 135 can instruct a start of a series of recording operations from reading of the image data from the memory 127, compression at the image processing unit 123, and writing of the image data in a recording medium (not illustrated) loaded on the external removable memory unit 130.

The operation unit 136 includes various button switches, and can set a photographing mode, a continuous shooting mode, a set, a macro, page feeding, flash setting, menu movement, white balance selection, photographing quality selection, exposure correction, and date and time. The operation unit 136 further includes a moving image photographing switch for starting and stopping moving image photographing, a left-right and up-down direction switch, a zoom magnification change switch of a reproduced image, an image display ON/OFF switch of the display device 110, a quick review ON/OFF switch for automatically reproducing captured image data immediately after photographing, and an image erasure switch for erasing the reproduced image.

Further, there is a compression mode switch for selecting compression rates of Joint Photographic Experts Group (JPEG) and Moving Picture Experts Group (MPEG) and a charge coupled device (CCD) RAW mode for directly digitizing and recording a signal from the image sensor. Furthermore, there is an AF mode setting switch for setting a one-shot AF mode to maintain an in-focus state of the autofocus function in the half-pressed state of the release switch and a servo AF mode to continue an autofocus operation.

The electronic dial 137 can set a shutter speed, a diaphragm value, and exposure. As described in detail below, the straight line indicating the detected roll angle of the orientation detection unit 129 to be displayed on the display device 110, or the captured image to be displayed on the display unit 110 can be rotated according to a rotational angle of the electronic dial 137.

A power switch 138 can switch and set each mode of power-on or power-off of the imaging apparatus 100. The power switch 138 can switch and set power-on and power-off of various accessory devices including the lens unit 200, the flash unit 300, and the recording medium connected to the imaging apparatus 100. A timer 139 has a clock function, a calendar function, a timer counter function, and an alarm function, and is used for system management such as changing time to a sleep mode or alarm notification.

The lens mounts 102 and 202 are interfaces for connecting the imaging apparatus 100 to the lens unit 200. Connectors 101 and 201 electrically connect the imaging apparatus 100 to the lens unit 200, and are controlled by the camera control unit 140. Accessory shoes 111 and 301 are interfaces for connecting the imaging apparatus 100 to the flash unit 300.

The lens unit 200 is a lens unit of an interchangeable lens type, and can guide an optical image of an object (not illustrated) from the lens 210 via the diaphragm 211, the lens mounts 202 and 102, and the shutter 144 to form an image on the image sensor 121.

The lens control unit 203 controls the entire lens unit 200. The lens control unit 203 can function as a memory for storing a constant, a variable and a program for an operation, and a nonvolatile memory for storing identification information such as a unique number of the lens unit 200, management information, function information such as a full-aperture F number, a minimum diaphragm value, or a focal distance, and present and past setting values. The lens control unit 203 also has a function of controlling the diaphragm 211, focusing of the lens 211, and zooming of the lens 210.

The flash unit 300 is connected to the accessory shoe 111. The interface 301 electrically connects the flash unit 300 and the imaging apparatus 100 in the accessory shoe 111. A flashlight emission control unit 302 controls the entire flash unit 300. The flashlight emission control unit 302 controls a light emission amount or light emission timing for a light emitting unit such as a xenon tube (not illustrated) based on information from the photometric unit 142.

Next, referring to a flowchart in FIG. 3 and display examples on the display device 110 illustrated in FIG. 2A to 2C, operations of the imaging apparatus 100 according to the first exemplary embodiment is described. In step S100, a user operates a predetermined operation unit, for example, the mode dial 134 or the operation unit 136 to set a correction mode of a roll angle output value that is a roll angle detected by the orientation detection unit 129.

Since the correction mode is selected and set in step S100, in step S101, the system control unit 120 starts to operate in a "live view mode" for displaying a captured image as a through-the-lens image on the display device 110 in real time. FIG. 2A illustrates a display example in this case. The user captures an image of an object to be set as a horizontal reference. In the example illustrated in FIG. 2A, the user captures the image of the horizon.

In step S102, under the control of the system control unit 120, the image processing unit 123 extracts linear components from the captured image in real time. The image processing unit 123 selects a longest straight line among the extracted straight lines, colors the straight line by a specific color to superimpose it with the captured image, and displays the straight line on the display device 110. In the example illustrated in FIG. 2A, the horizon is selected as the longest straight line, and a straight line 401 is superimposed on the captured image and displayed.

In step S103, the system control unit 120 calculates coordinate values on images at both ends (start point and end point) of the longest straight line extracted in step S102, and calculates an average value thereof to acquire a center value of the straight line.

In step S104, under the control of the system control unit 120, the orientation detection unit 129 detects a roll angle, and superimposes an X axis indicating a roll angle 0° and a Y axis indicating a roll angle 90° of the acceleration sensor with the captured image to display the axes on the display device 110. When the axes are superimposed on the captured image to be displayed, an original point of the X and Y axes is matched with the center value of the straight line calculated in step S103. FIG. 2B illustrates a display example in this case. More specifically, FIG. 2B illustrates the straight line 401 extracted from the captured image, the X axis 402 indicating the roll angle 0°, and the Y axis 403 indicating the roll angle 90°.

In step S105, the system control unit 120 rotates, according to a user's predetermined operation such as a rotational operation of the operation unit 136 or the electronic dial 137, the displayed X and Y axes indicating roll angle output values of the orientation detection unit 129 around the X and Y axis original point. The user rotates the X and Y axes until the X and Y axes indicating the roll angle output values of the orientation detection unit 129 match a gradient of the extracted straight line.

Referring to FIG. 2B, the X axis 402 indicating the roll angle output value of the orientation detection unit 129 is rotated until it matches the extracted straight line 401. In the example illustrated in FIG. 2B, the X axis 402 is rotated in a minus direction (counterclockwise as indicated by an illustrated arrow). A rotational angle in this case becomes a roll angle output correction value of the orientation detection unit 129. The rotational angel value of the axis can be displayed on the display device 110. Displaying the rotational angle enables the user to recognize a correction amount.

In FIG. 2B, the extracted straight line is a horizontal direction. However, a straight line of a gravitational direction can be extracted. In this case, the operation unit 136 or the electronic dial 137 is rotated until the Y axis indicating the roll angle output value of the orientation detection unit 129 matches the extracted straight line.

In step S106, the system control unit 120 displays a guidance for instructing the user to press an operation completion button (determination button) on the display device 110. Then, the user presses the operation completion button, such as the operation unit 136, to select operation completion.

In step S107, the system control unit 120 corrects the roll angle output value of the orientation detection unit 129 in a plus direction by an amount equal to the rotational angle corrected in step S105. This corrected value is stored in the nonvolatile memory 128. During photographing thereafter, the user can check levelness by utilizing the corrected roll angle output value of the orientation detection unit 129. Concerning the levelness checking method as described above, the X axis indicating the roll angle 0° or the Y axis indicating the roll angle 90° can be displayed on the display device 110, or notification is made by the LED or a warning sound.

The X and Y axes indicating the corrected roll angle output value of the orientation detection unit 129 can be distinguished from the X and Y axes displayed before the correction by changing a display method (e.g., changing colors). Accordingly, the user can determine that the currently displayed X and Y axes indicate the corrected roll angle output value or the roll angle output value at the state of shipment from the factory. The roll angle output value in the factory shipment state is stored in the nonvolatile memory 128. Thus, by operating an arbitrary operation button, the roll angle output value of the orientation detection unit 129 can be returned to the roll angle output value in the factory shipment state.

The above-described first exemplary embodiment is advantageous in that the corrected value can be fine tuned because the user himself/herself corrects a relative angle between the straight line extracted from the captured image and the roll angle output value of the orientation detection unit 129.

The configuration in which the user performs correction by checking the captured image in real time in the live view mode for displaying the through-the-lens image in step S101 has been described. However, the present invention is not limited to this configuration. For example, a configuration where in step S101, the captured image stored in the external removable memory unit 130 is reproduced and displayed can be employed. In this case, during photographing, the captured image data and the roll angle output value of the photographing time are stored with associated with each other in the external removable memory unit 130. Operations in this configuration are described below.

In step S102, under the control of the system control unit 120, the image processing unit 123 extracts linear components from the reproduced image. The image processing unit 123 selects a longest straight line among the extracted straight lines, colors the straight line by a specific color to superimpose it on the reproduced image, and displays the straight line on the display device 110.

In step S103, the system control unit 120 calculates coordinate values on images at both ends (start point and end point) of the longest straight line extracted in step S102, and calculates an average value thereof to acquire a center value of the straight line.

In step S104, the system control unit 120 reads a roll angle output value of photographing time associated with the reproduced image, and superimposes an X axis indicating a roll angle 0° and a Y axis indicating a roll angle 90° of the acceleration sensor on the reproduced image to display the axes on the display device 110. When the axes are superimposed on the reproduced image to be displayed, an original point of the X and Y axes is matched with the center value of the straight line calculated in step S103.

In step S105, the system control unit 120 rotates, according to a user's predetermined operation such as an operation of the operation unit 136 or the electronic dial 137, the reproduced image around the X and Y axis original point. FIG. 2C illustrates a display example in this case. With the rotation of the operation unit 136 or the electronic dial 137, the user rotates a reproduced image 404 until the X axis 402 or the Y axis 403 indicating the roll angle output value of the orientation detection unit 129 matches a gradient of the extracted straight line 401.

In the example illustrated in FIG. 2C, the reproduced image 404 is rotated in a plus direction (clockwise as indicated by an illustrated arrow). Thus, when the captured image stored in the external removable memory unit 130 is reproduced and displayed, the reproduced image can be rotated. Needless to say, a configuration where the X and Y axes indicating the roll angle output values of the orientation detection unit 129 are rotated as described above can be employed.

In step S106, the system control unit 120 displays a guidance for instructing the user to press an operation completion button (determination button) on the display device 110. Then, the user presses the operation completion button, such as the operation unit 136, to select operation completion.

In step S107, the system control unit 120 corrects the roll angle output value of the orientation detection unit 129 in a minus direction by an amount equal to the rotational angle corrected in step S105.

The above configuration has an advantage in that when correction is performed in the live view mode, the correction can be made before photographing. On the other hand, there is a possibility that depending on photographing conditions, due to an influence of camera shaking or movement of the object, the object or the X and Y axes indicating the roll angle output values of the orientation detection unit 129 displayed on the display device 110 may be shifted, casing a difficulty of correction. In the case of performing correction by using the reproduced image, however, the object and the X and Y axes indicating the roll angle output values of the orientation detection unit 129 during the photographing are fixed, and hence there is an advantage of easier correction.

A second exemplary embodiment of the present invention is directed to a configuration where a relative angle between a straight line extracted from a captured image and a roll angle output value of an orientation detection unit 129 is automatically corrected. A configuration of an imaging apparatus 100 is similar to that of the first exemplary embodiment, and thus description thereof is omitted.

Figure 4:
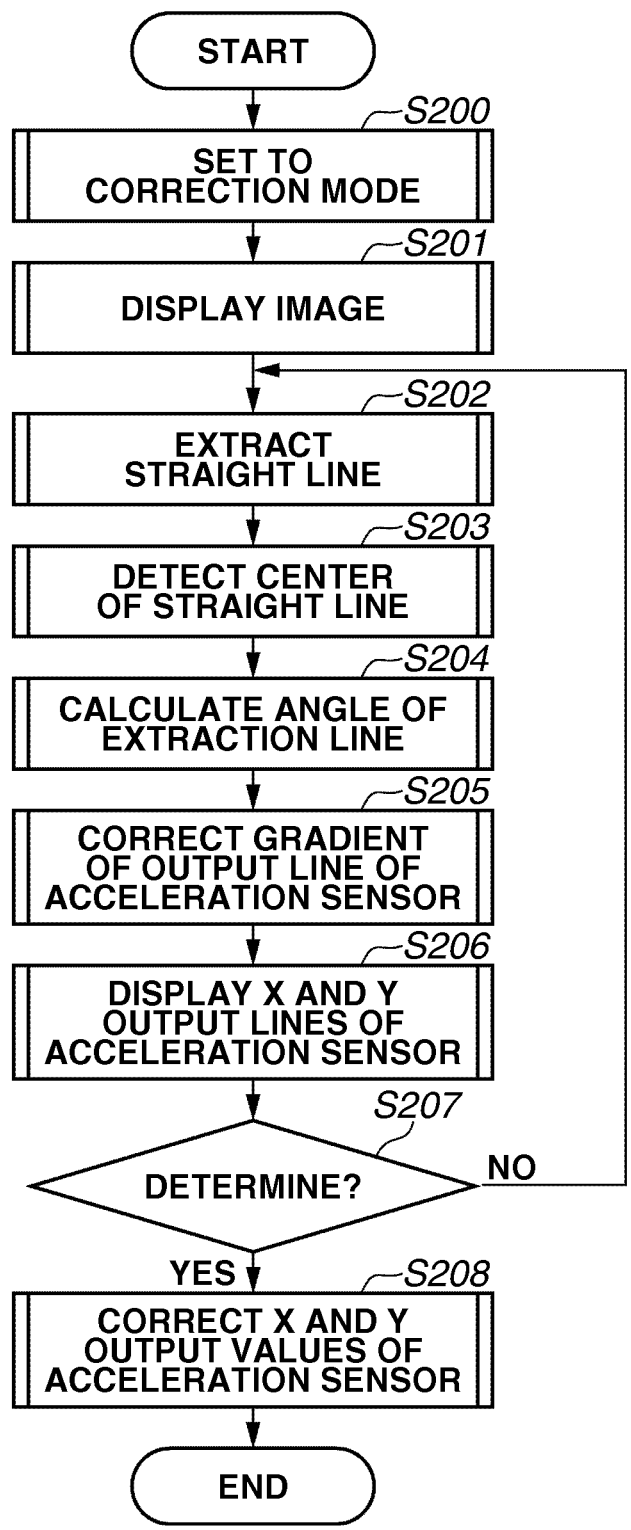
FIG. 4 is a flowchart illustrating operations of an imaging apparatus according to a second exemplary embodiment.

Next, referring to a flowchart in FIG. 4, operations of the imaging apparatus 100 according to the second exemplary embodiment is described. Steps S200 to S203 are similar to steps S100 to S103 of the first exemplary embodiment, and thus description thereof is omitted.

In step S204, under the control of a system control unit 120, an image processing unit 123 detects a tilt angle of the extracted straight line in the captured image.

In step S205, the system control unit 120 calculates a roll angle output value of the orientation detection unit 129 so that it can match the tilt angle of the extracted straight line extracted in step S204. In this case, when a difference between the tilt angle of the extracted straight line and the roll angle output value of the orientation detection unit 129 is less than 45°, a correction value is generated so that a roll angle output value 0° of the orientation detection unit 129 can match the tilt angle of the extracted straight line. When the difference between the tilt angle of the extracted straight line and the roll angle output value of the orientation detection unit 129 is equal to or more than 45°, a correction value is generated so that a roll angle output value 90° of the orientation detection unit 129 can match the tilt angle of the extracted straight line.

In step S206, the system control unit 120 superimposes the X axis indicating the roll angle 0° and the Y axis indicating the roll angle 90° of the acceleration sensor which are corrected in step S205 on the captured image to display the axes on the display device 110. When the axes are superimposed on the captured image to be displayed, an original point of the X and Y axes is matched with the center value of the straight line calculated in step S203.

In step S207, the system control unit 120 displays a guidance for instructing the user to press an operation completion button (determination button) on the display device 110. Then, the user presses the operation completion button, such as the operation unit 136, to select operation completion.

In step S208, the system control unit 120 corrects the roll angle output value of the orientation detection unit 129 by an amount equal to a rotational angle corrected in step S205. This corrected value is stored in the nonvolatile memory 128.

According to the second exemplary embodiment, the relative angle between the straight line extracted from the captured image and the roll angle output value of the orientation detection unit 129 is automatically corrected without any user's operation. Thus, the correction can be completed within time shorter than that in the first exemplary embodiment.

The configuration in which the user performs correction by checking the captured image in real time in the live view mode for displaying the through-the-lens image in step S201 has been described. However, the present invention is not limited to this configuration. As described above in the first exemplary embodiment, for example, a configuration where the captured image stored in the external removable memory unit 130 is reproduced and displayed in step S201 can be employed. An operation in this case is similar to that in the live view mode except for use of a reproduced image, and thus description thereof is omitted. When the captured image stored in the external removable memory unit 130 is reproduced and displayed, a configuration where in step S206, the X and Y axes indicating the roll angle output values of the orientation detection unit 129 are fixed, and the reproduced image is rotated in a direction opposite that of a correction value to be displayed can be employed.

The present invention can be achieved by executing the following processing. More specifically, software (a program) for achieving the functions of the exemplary embodiments is supplied to a system or an apparatus via a network or various storage media, and a computer (or a central processing unit (CPU) or a micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-138540 filed Jun. 17, 2010, which is hereby incorporated by reference herein in its entirety.

What is claimed is:

1. An imaging apparatus comprising:
    an imaging unit;
    an orientation detection unit configured to detect an orientation of the imaging apparatus;
    a display unit configured to display an image captured by the imaging unit;
    a straight line extraction unit configured to extract a first straight line from the image captured by the imaging unit; and
    a control unit configured to superimpose the first straight line extracted by the straight line extraction unit on the captured image and a second straight line based on the output of the orientation detection unit to be displayed by the display unit.

2. The imaging apparatus according to claim 1, wherein the control unit calculates a relative angle between an output from the orientation detection unit and a gradient of the first straight line, and wherein the control unit corrects an output of the orientation detection unit based on the relative angle.

3. The imaging apparatus according to claim 2, wherein the control unit rotates the second straight line based on the relative angle, and superimposes the second straight line which is rotated.

4. The imaging apparatus according to claim 1, wherein the first straight line extraction unit extracts a longest linear component from the captured image.

5. The imaging apparatus according to claim 1, wherein the control unit calculates a center of the first straight line, and wherein the control unit superimposes the second straight line based on the output of the orientation detection unit on the captured image so that the second straight line passes through the calculated center.

6. The imaging apparatus according to claim 1, further comprising:
    an operation unit,
    wherein the control unit rotates the second straight line superimposed on the captured image according to an operation of the operation unit, and
    wherein the control unit corrects an output of the orientation detection unit based on the rotation angle of the second straight line based on the output of the orientation detection unit.

7. The imaging apparatus according to claim 1, further comprising:
    an operation unit,
    wherein the control unit rotates the captured image according to an operation of the operation unit, and
    wherein the control unit corrects an output of the orientation detection unit based on the rotation angle of the captured image.

8. A method for controlling an imaging apparatus that includes an imaging unit, an orientation detection unit, and a display unit, the method comprising:
    capturing an image by the imaging unit;
    detecting an orientation of the imaging apparatus by the orientation detection unit;
    displaying the captured image by the display unit;
    extracting a first straight line from the captured image; and
    performing control to superimpose the first straight line extracted from the captured image and a second straight line based on the output of the orientation detection unit to be displayed by the display unit.

9. A program embodied on a non-transitory computer-readable medium for controlling an imaging apparatus that includes an imaging unit, an orientation detection unit, and a display unit, the program comprising the steps of:
    capturing an image by the imaging unit;
    detecting an orientation of the imaging apparatus by the orientation detection unit;
    displaying the captured image by the display unit;
    extracting a first straight line from the captured image; and
    performing control to superimpose the first straight line extracted from the captured image and a second straight line based on the output of the orientation detection unit to be displayed by the display unit.

* * * * *